Dec. 25, 1962  H. L. DUNLAP  3,070,042
AUTOMOBILE SHIPPING DEVICE
Filed Nov. 14, 1958  4 Sheets-Sheet 1
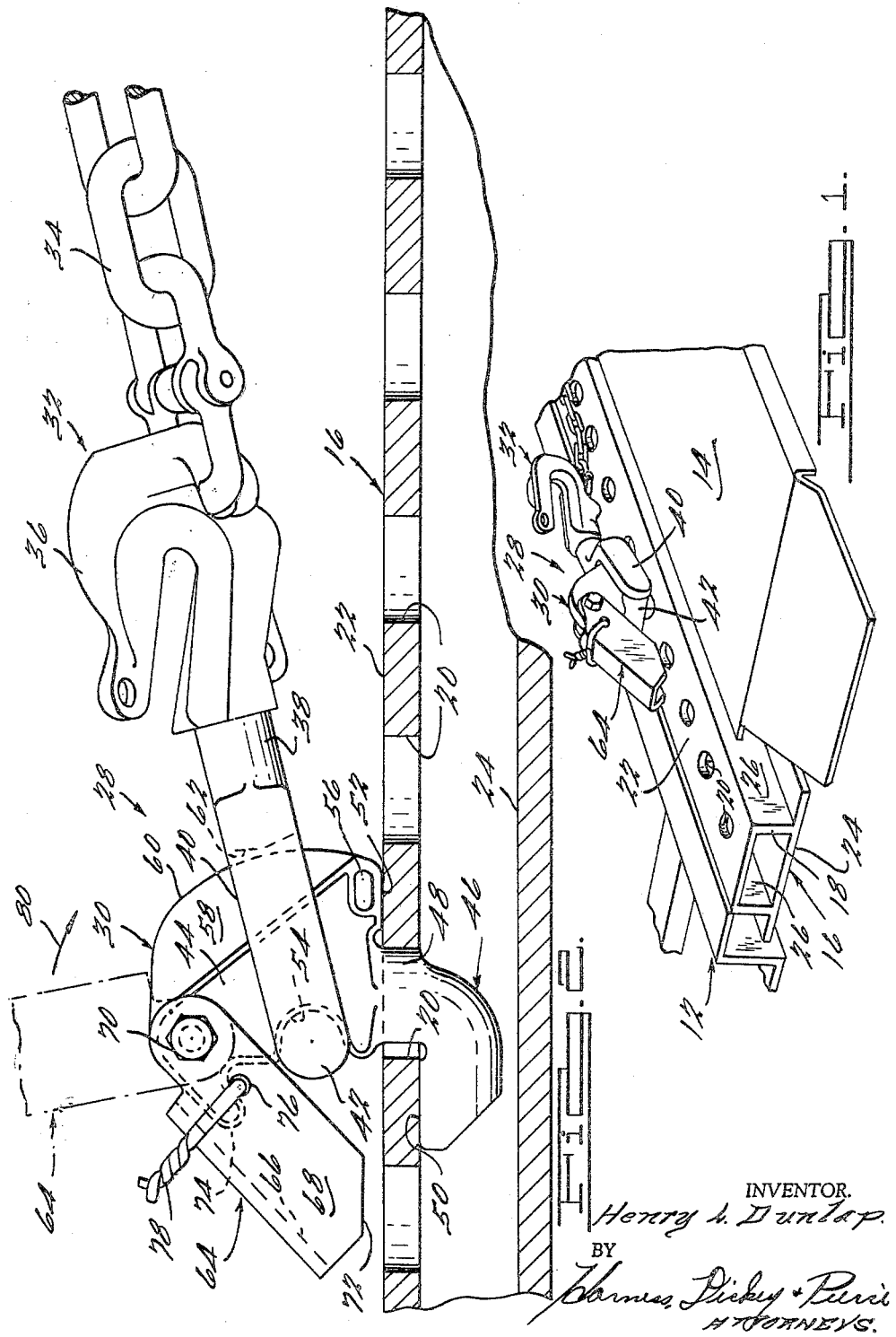
INVENTOR.
Henry L. Dunlap
BY
Thomas, Dickey & Pierce
ATTORNEYS.

INVENTOR.
Henry L. Dunlap.
BY
Harness, Dickey & Pierce
ATTORNEYS.

Dec. 25, 1962     H. L. DUNLAP     3,070,042
AUTOMOBILE SHIPPING DEVICE
Filed Nov. 14, 1958     4 Sheets-Sheet 3
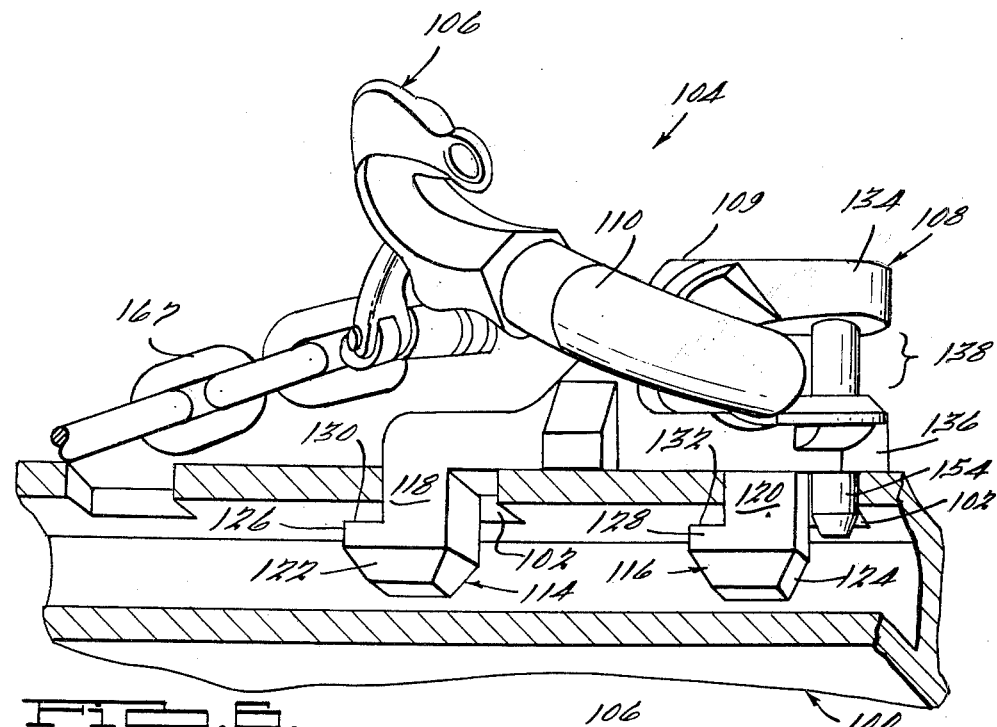
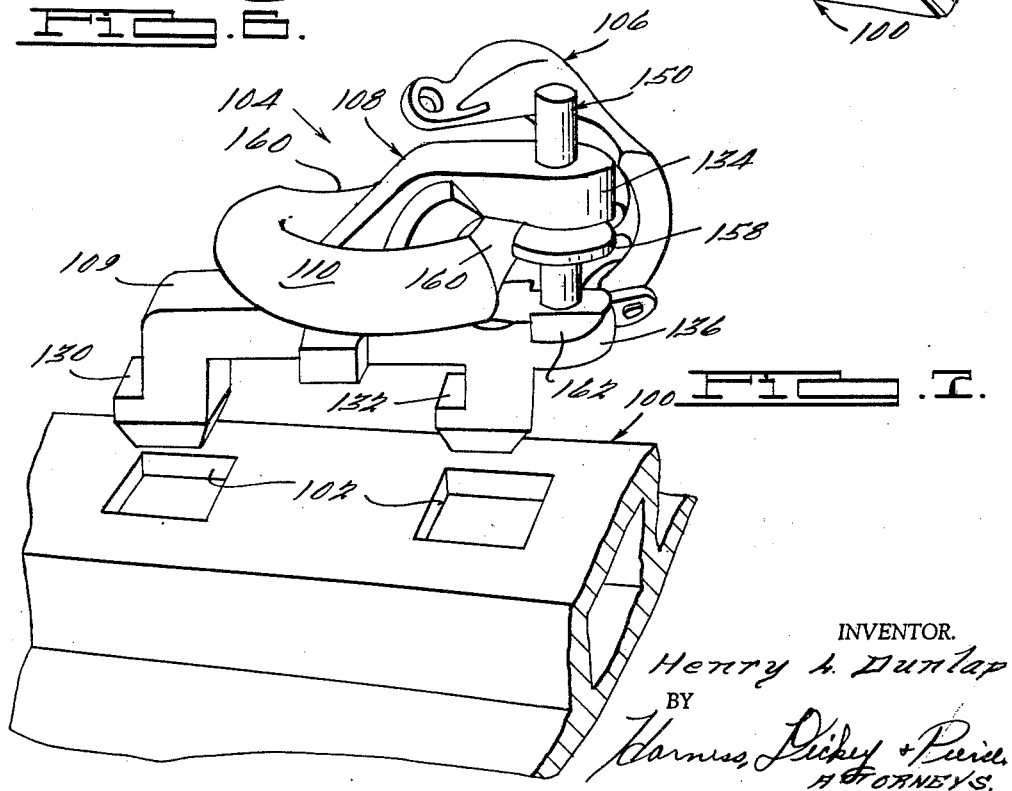
INVENTOR.
Henry L. Dunlap,
BY
Harness, Dickey + Pierce
ATTORNEYS.

Dec. 25, 1962 H. L. DUNLAP 3,070,042
AUTOMOBILE SHIPPING DEVICE
Filed Nov. 14, 1958 4 Sheets-Sheet 4

INVENTOR.
Henry L. Dunlap
BY
Harness, Dickey & Pierce
ATTORNEYS.

United States Patent Office 3,070,042
Patented Dec. 25, 1962

3,070,042
AUTOMOBILE SHIPPING DEVICE
Henry L. Dunlap, Dearborn, Mich., assignor to Evans Products Company, Plymouth, Mich., a corporation of Delaware
Filed Nov. 14, 1958, Ser. No. 773,969
9 Claims. (Cl. 105—368)

The present invention relates to an improved automobile shipping device and more particularly, to an improved tie-down fitting for securing an automobile in place for shipment in an automobile shipping device.

It is an object of the present invention to provide an improved tie-down fitting for an automobile shipping device which is simple in design, economical of manufacture and reliable and efficient in operation.

It is also an object of the present invention to provide an improved tie-down fitting of the above mentioned type adapted to be selectively connected to an apertured tie-down support rail at any one of a plurality of apertures spaced therealong and which is both readily secured against inadvertent removal from the tie-down support rail and, when desired, readily disengaged from the tie-down support rail.

More specifically, it is also an object of the present invention to provide an improved tie-down fitting including improved means movably mounted thereon and adapted to be secured in a position in which it prevents movement of the tie-down fitting relative to the tie-down support rail in the manner necessary to effect removal of the tie-down fitting from the support rail and which, when desired, may be moved to a withdrawn or inoperative position in which the tie-down fitting may be readily moved in the manner required to disengage it from the tie-down support rail.

It is a further object of the present invention to provide an improved tie-down fitting including a grab hook and simply constructed efficient means for connecting the grab hook to the body of the tie-down fitting to prevent disconnection therefrom.

Another object of the present invention is to provide an improved tie-down fitting which, when in use, automatically and positively holds the locking member thereof in position to prevent movement of the fitting in the manner required to disengage it from the tie-down rail.

More specifically, it is a further object of this invention to provide an improved tie-down fitting including a hook adapted to extend through an aperture in a tie-down rail to engage an inner surface thereof and a locking member movable into the aperture to prevent movement of the tie-down fitting to withdraw the hook from the aperture.

It is also an object of the invention to provide such an improved tie-down fitting including a tie-down member adapted to be connected to the automobile and which is movable between an operative position in which it positively prevents movement of the locking member to withdraw the hook from the aperture in the tie-down rail and a second position in which it does not interfere with such withdrawal of the hook.

Other and more detailed objects of the present invention will be apparent to those skilled in the art from a consideration of the following specification, the appended claims, and the accompanying drawings wherein:

FIGURE 1 is a perspective view of a portion of an automobile shipping device including a tie-down fitting constructed according to the present invention;

FIGURE 2 is an enlarged view of the structure illustrated in FIGURE 1 showing parts in section;

FIGURE 6 is a broken perspective view of a part of an automobile shipping device showing a tie-down fitting embodying a modified form of the present invention;

FIGURE 7 is a perspective view of the construction illustrated in FIGURE 6 showing the tie-down fitting removed from the apertured tie-down support rail;

Figure 3:
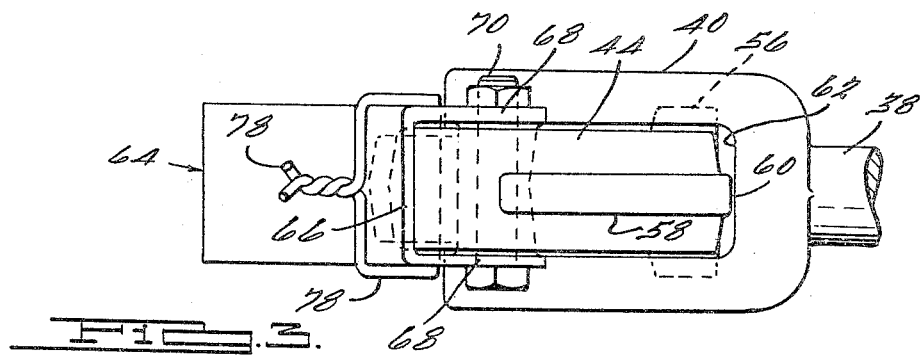
FIGURE 3 is a broken plan view of the tie-down fitting illustrated in FIGURE 2.
Figure 4:
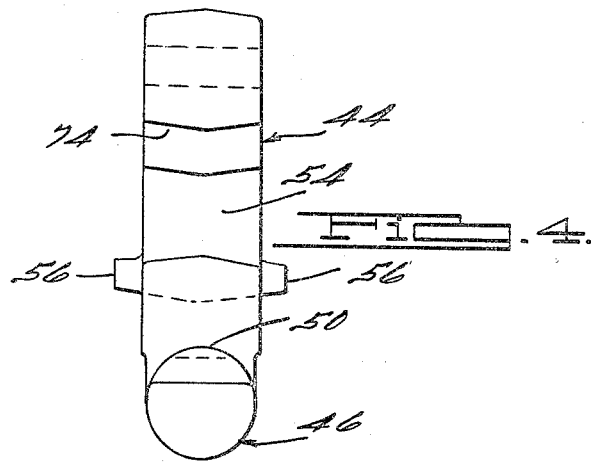
FIGURE 4 is an end elevational view of the body member of the tie-down fitting illustrated in FIGURE 2.
Figure 5:
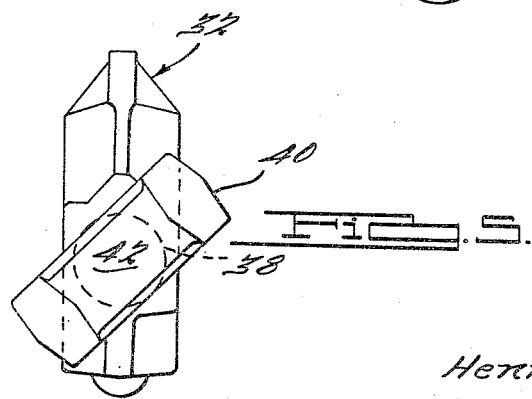
FIGURE 5 is an end elevational view of the grab hook member of the tie-down fitting illustrated in FIGURE 2.

Referring to FIGURES 1 to 5, inclusive, of the drawings, and particularly to FIGURE 1 thereof, the automobile shipping device partially there illustrated includes a frame generally indicated at 12 which carries wheel pans 14 adapted to receive and support the wheels of an automobile to be shipped and an apertured tie-down support rail generally indicated at 16 which is preferably resiliently supported on the frame 12. Such resilient mounting of tie-down rails is the subject matter of the co-pending application, Serial No. 500,074, filed April 8, 1955 of the present applicant and Harvey W. Chapman, entitled Resiliently Mounted Tie-Down Support Rails, now Patent No. 2,873,693 dated February 17, 1959.

In the construction illustrated in the present application, this tie-down support rail 16 comprises an inverted U-shaped channel member 18 having a plurality of apertures 20 disposed centrally of and equally spaced longitudinally along the web portion 22 thereof, and a lower plate 24 parallel to the web portion 22 and extending across and welded or otherwise suitably secured to the lower edges of the leg portions 26 of the channel member 18.

The improved tie-down fitting of the present invention is generally indicated at 28 and comprises a tie-down hook generally indicated at 30 and a grab hook generally indicated at 32. The grab hook 32 carries a chain 34 adapted to engage a portion of the automobile, or passed through a tie loop suitably secured to the automobile, and having one end permanently secured to the hook 32 and having a return portion of the chain 34 adapted to be releasably held by the grab hook 32 in the conventional way. The hook 32 includes a grab hook portion 36, a neck portion 38 and a clevis portion 40 having an integrally formed cross bar 42 at the outer end of the clevis portion 40.

The tie-down hook 30 includes a body forging 44 having an integrally formed hook portion 46 extending downwardly therefrom including a shank portion 48 adapted to extend through one of the apertures 20 in the tie-down rail 16 and having an upwardly presenting surface 50 adapted to engage the inner surface of the web portion 22 of the tie-down rail 16 at one side of the aperture 20. The body 44 has a downwardly presenting surface 52 disposed at the opposite side of the shank 48 from the surface 50 and adapted to engage the upper or outer surface of the web portion 22 of the tie-down rail 16, as clearly illustrated in FIGURE 2.

The body 44 above the shank 48 of the hook 46, and at the opposite side thereof from the body surface 52, has a transversely extending bearing portion 54 adapted to receive the cross bar portion 42 at the outer end of the grab hook clevis 40. As best illustrated in FIGURE 3, the body 44 is of a thickness adapted to fit within the opening in the clevis 40, but is provided at its lower portion adjacent the surface 52 with laterally outwardly extending ears 56 adapted to engage the clevis 40 to limit downward movement of the clevis 40 relative to the body 44. It will also be noted that, as best illustrated in FIGURE 2, the tie-down hook body 44 has a centrally disposed flange portion 58 having an arcuately shaped outer edge portion 60 adapted to engage the transversely extending surface 62 of the opening in the clevis 40 to prevent relative movement between the clevis 40 and the body 44 at right angles to the arcuate edge portion 60 in a direction to move the clevis cross bar 42 out of the bearing portion 54. The tie-down hook 30 includes a locking device generally indicated at 64 which, in the construction illustrated in FIGURES 1 to 5, inclusive, comprises a channel shaped sheet metal member including a web portion 66 and spaced flanges 68. These flanges, as best illustrated in FIGURE 3, are adapted to fit over opposite sides of the body 44 at the upper end thereof and receive a bolt 70 for pivotally connecting the locking device 64 to the body 44. Adjacent the pivotal connection provided by the bolt 70, the web portion 66 of the locking device 64 is cut away to permit pivotal movement of the locking device 64 relative to the body 44 from the operative position illustrated in full lines in FIGURES 1, 2 and 3, to the withdrawn or inoperative position illustrated in broken lines in FIGURE 2. Also, the flanges 68 at the opposite end thereof from the pivotal connection provided by the bolt 70, are cut at an angle to the web 64 to provide the flats 72, see FIGURE 2, which are adapted to engage the adjacent outer surface of the tie-down rail 16 when the locking device 64 is in the operative position illustrated in full lines, to prevent removal of the tie-down hook 30 from the tie-down rail 16. To provide for securing the locking device in this operative position, the tie-down hook body 44 has a finger portion 74 extending generally parallel to the web 66 of the locking device when the latter is in the operative position and the flanges 68 are provided with aligned openings 76 through which may be received the safety wire 78 for securing the locking device in the operative position.

It is a feature of the present invention that the grab hook 32 is securely connected to the tie-down hook 30 by the simple operation of passing the finger 74 and upper portion of the body 44 through the opening of the clevis hook 40 prior to the connection of the locking device 64 thereto, and then connecting the locking device 64 to the body 44 by the bolt 70. The laterally extending stops 56 limit movement of the clevis 40 relative to the body 44 in one direction, and the flanges 68 of the locking device 64 and the bolt 70 limit movement of the clevis 40 relative to the body 44 in the opposite direction. During such movement, the cross bar 42, at the outer end of the clevis is held in the bearing portion 54 because of the small clearance between the arcuately shaped edge portion 60 of the flange 58 and the inner surface 62 of the opening in the clevis 40.

It will be readily appreciated by those skilled in the art, that when the locking device 64 is in the inoperative position illustrated in broken lines in FIGURE 2, the tie-down hook 30 by movement in the general direction of the arrow 80 in FIGURE 2, may be moved so as to insert the hook 46 through one of the openings 20 and move the tie-down hook 30 to the position there illustrated in full lines. The locking device 64 may then be pivoted about the bolt 70 to the operative position illustrated in full lines and secured in place by the safety wire 78. When it is desired to remove the tie-down hook from the tie-down rail 16, the wire 78 is removed, the locking device 64 pivoted to the inoperative position and then the tie-down hook 30 may be moved in a direction generally opposite to that indicated by the arrow 80 to withdraw the hook 46 from the aperture 20.

In the modification illustrated in FIGURES 6 through 10, inclusive, the tie-down rail 100 is of the same construction as the above described tie-down rail 16, except that the apertures 102 provided therein are rectangular rather than circular. The tie-down fitting generally indicated at 104 similarly comprises a grab hook 106 and a tie-down hook member generally indicated at 108. The grab hook 106 differs from the grab hook 32 in that, in place of the clevis 40, it is provided with a ring 110 secured to the neck portion 112, the shape of this 110 being best illustrated in FIGURES 8 and 9.

The tie-down hook 108 in the modification illustrated in FIGURES 6 through 10, inclusive, comprises a body 109 having a pair of downwardly extending hooks generally indicated at 114 and 116 having rectangular shank portions 118 and 120, respectively. The lower ends of these hooks are tapered as indicated at 122 and 124 to facilitate insertion through the apertures 102 and the hooks have laterally extending portions 126 and 128, respectively, provided with upwardly presenting surfaces 130 and 132, respectively, adapted to engage the inner surface of the web portion of the tie-down rail 100 at corresponding sides of the apertures 102.

The body 109 has upper and lower jaws 134 and 136, respectively, which define therebetween an opening 138 through which the ring 110 may pass and the throat portion of which constitutes a bearing 140 adapted to be engaged by and support the ring 110, the body being provided with laterally extending projections or pads 142 at opposite sides thereof to provide added bearing area 144 for supporting the ring 110. The jaws 134 and 136, outwardly of the ring 110, have aligned openings 146 and 148, respectively, which slidably support a vertically movable pin 150 which prevents movement of the ring 110 outwardly through the jaw opening 138. The pin 150 includes an upper portion 152 of largest diameter freely slidable in the opening 146 in the upper jaw 134, a lower end portion 154 of smallest diameter freely slidable in the opening 148 in the lower jaw 136, and an intermediate sized portion 156 adapted to receive and have a press fit with a collar 158. In assembling the tie-down hook 108, the ring 110 is moved into the jaw opening into engagement with the supporting surface 140, after which the collar 158 is positioned on the lower jaw 136 with the central opening of the collar 158 aligned with the opening 148 in the lower jaw and the pin 152 is then moved downwardly through the opening 146 in the upper jaw, the minimum diameter lower portion 154 passing through the opening in the collar 158 and the intermediate pin portion 156 being forced into the opening in the collar 158 to provide a press fit therewith.

Figure 8:
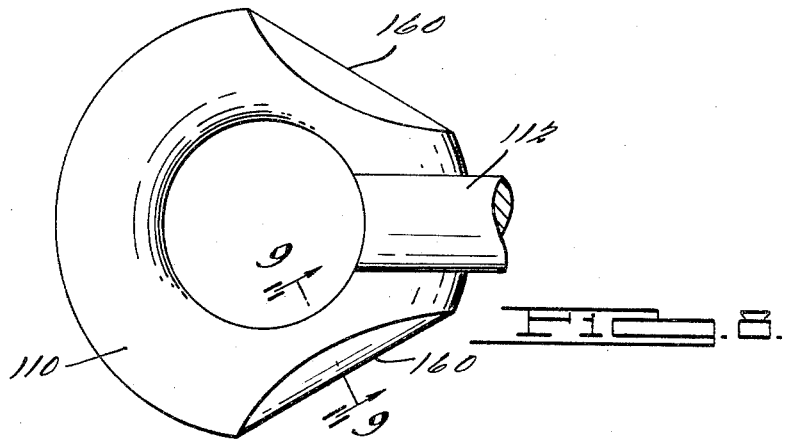
FIGURE 8 is a broken plan view of a portion of the grab hook of the tie-down fitting illustrated in FIGURES 6 and 7.
Figure 9:
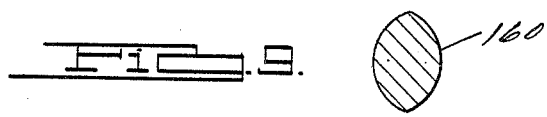
FIGURE 9 is a sectional view of the structure illustrated in FIGURE 8, taken substantially along the line 9—9 thereof; and, FIGURE 10 is a broken sectional view of the tie-down fitting illustrated in FIGURE 6.

As best illustrated in FIGURE 8, the ring 110 of the grab hook 106 has reduced portions 160 which are of reduced thickness, as best illustrated in FIGURE 9, so that when the ring 110 is positioned as illustrated in FIGURE 7, with this portion of reduced thickness 160 between the jaws 134 and 136, the pin 150 may be raised and the collar 158 may move past this reduced portion 160 without interference therewith. The lower jaw 136 is relieved as shown at 162 to facilitate access to the under surface of the collar 158 to force the collar and pin upwardly. The body 109 is also provided intermediate the downwardly extending hooks 114 and 116 with laterally extending bosses 164 adapted to engage the upper surface of the tie-down rail 100 to provide lateral stability to the tie-down hook 108.

It will now be appreciated that the tie-down hook 108 is connected to the tie-down rail 100 in the following manner. Starting with the pin 150 in the upper position as illustrated in FIGURE 7, the hook body 109 is moved downwardly to move the spaced hooks 114 and 116 into adjacent holes 102 in the tie-down rail 100. When the lateral projections 126 and 128 of these hooks have been moved through the openings 102, the tie-down hook body 109 is then moved to the left as viewed in FIGURES 6 and 7 to move the hooks 118 and 120 against the left-hand edges of the holes 102 as viewed in FIGURES 6 and 7, and to move the surfaces 130 and 132 thereof to underlie the web portion of the rail 100 at corresponding sides of the holes 102.

Figure 10:
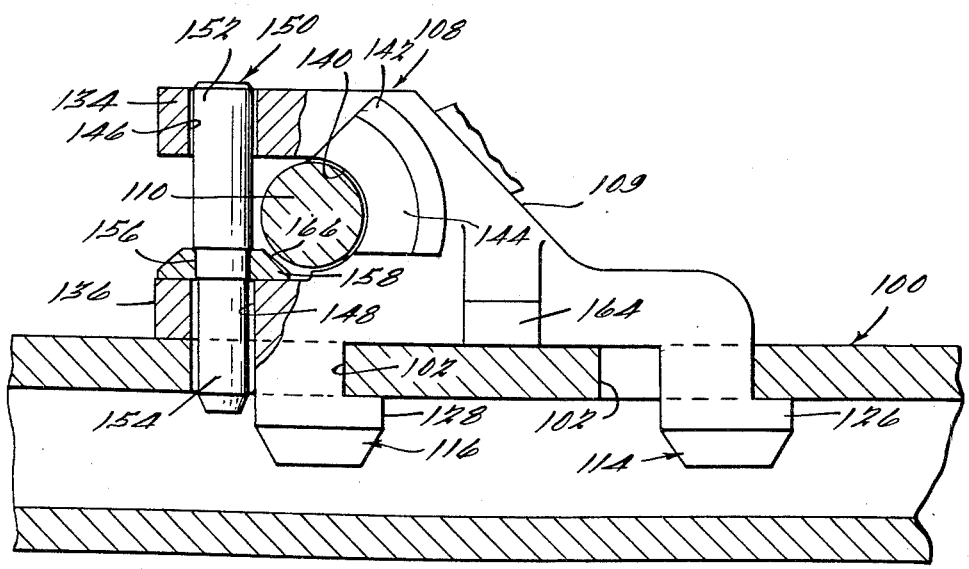

With the ring 110 of the grab hook 106 disposed with the reduced portion 160 thereof between the jaws 134 and 136, as illustrated in FIGURE 6, the pin 150 is moved downwardly, moving the washer 158 past the reduced thickness portion 160 and to the position illustrated in FIGURES 6 and 10. The ring 110 is then turned so that the full portion of the ring 110 is disposed between the jaws 134 and 136, which position is illustrated in FIGURES 6 and 10, and in which the ring 110 positively prevents movement of the collar upwardly past the ring 110 as is clearly illustrated in FIGURES 6 and 10. It will be noted that the upper surface of the collar 158 is inclined as illustrated at 166 to provide a substantially flat surface for engagement with the ring 110. When the chain 167 is connected to the automobile, the grab hook ring 110 engages the bearing surfaces 140 and 144 and a portion of the ring of full circular cross section is held between the jaws 134 and 136.

The pin 150 is of a length as best illustrated in FIGURES 6 and 10, such that when the pin is moved downwardly to the position there illustrated, in which the collar 158 engages the upper surface of the lower jaw 136, the smaller lower end portion of the pin 154 extends downwardly through the opening 148 in the lower jaw 136 and to the opening 102 in the tie-down rail 100 in which the hook 116 is disposed. It will be appreciated that with the pin portion 154 thus received in the tie-down rail aperture 102, the tie-down hook 108 is locked against disengagement from the tie-down rail, since the pin 154 prevents movement of the tie-down hook to the right as illustrated in FIGURE 6 and to the left as illustrated in FIGURE 10, as required to permit withdrawal of the hooks 114 and 116 through the apertures 102.

While only two specific embodiments of the present invention have been illustrated and described in detail herein, it will be readily apparent to those skilled in the art that numerous modifications and changes may be made without departing from the spirit of the present invention.

What is claimed is:

1. In a tie-down adapted for use in securing an automobile in a shipping device to connect the automobile to an apertured plate portion of the shipping device, a connector adapted to be connected to said automobile and comprising a body adapted to engage the outer surface of said plate portion at one side of one of the apertures therein, a hook connected to said body and adapted to extend through said one of the apertures of said apertured plate portion and engage the inner surface of said plate portion at the opposite side of said one of said apertures, and means pivotally mounted on said body outwardly of said plate portion for movement between a first position in which it is adapted to engage said outer surface of said plate portion at said opposite side of said one of said apertures to prevent movement of said connector relative thereto to withdraw said hook from said aperture and a second position in which said means does not interfere with such motion of said connector relative to said plate portion, and tie-down means connected to said connector for connecting said connector to said automobile.

2. In a tie-down adapted for use in securing an automobile in a shipping device to connect the automobile to an apertured plate portion of the shipping device, a connector comprising a body adapted to engage the outer surface of said plate portion at one side of one of the apertures of said apertured plate portion, a hook connected to said body and adapted to extend through said one of said apertures and engage the inner surface of said plate portion at the opposite side of said one of said apertures, said hook and said body co-operating when so engaged with said plate portion to prevent rotation of said connector in one direction relative to said plate portion, said body having a bearing surface so disposed that a force exerted against said bearing surface tends to rotate said connector relative to said body in said one direction, a tie-down member adapted to be connected to said automobile and having a clevis including a pair of spaced arms and a crossbar interconnecting said arms to define a clevis opening and engaging said bearing surface, said body having a projection adapted to engage said clevis to limit pivotal movement of said clevis relative to said connector in one direction, and a locking member mounted on said body and adapted to engage said clevis to limit pivotal movement of said clevis relative to said connector in the opposite direction, said clevis being pivotally movable relative to said body, when said crossbar is engaging said bearing surface and prior to said locking member being mounted on said body, to move a portion of said body through said clevis opening and said locking member being mounted on said portion of said body.

3. The combination defined in claim 2 wherein said locking member is movable relative to said body between a first position in which it is adapted to engage said plate portion to prevent movement of said connector relative thereto to withdraw said first named hook from said one of said apertures and a second position in which it does not interfere with such motion of said connector relative to said plate portion, and means for holding said locking member in said first position.

4. The combination as defined in claim 2 wherein said body includes an arcuately extending surface adapted to engage said clevis at the opposite end of said clevis opening from said crossbar to limit movement of said clevis relative to said body in a direction to remove said crossbar from said bearing surface.

5. In a tie-down adapted for use in securing an automobile in a shipping device to connect the automobile to an apertured plate portion of the shipping device, a connector comprising a body adapted to be disposed at one side of said plate portion and a hook connected to said body and adapted to extend through one of the apertures of said apertured plate portion and engage the opposite side of said plate portion, said body including a portion adapted to engage said one side of said plate portion, said hook and body co-operating when so engaged with said plate portion to prevent rotation of said connector relative to said plate portion in a direction to withdraw said hook from said one of said apertures, said body including a pair of jaws defining a jaw opening therebetween, a tie-down member adapted to be connected to said automobile and having a loop portion extending between said jaws through said jaw opening to connect said tie-down member to said connector and urge said connector to rotate relative to said plate portion in a direction opposite to said direction, a locking member mounted on and extending between said jaws to prevent removal of said loop portion from between said jaws and movable to and from a position in which it is adapted to engage said plate portion to prevent movement of said connector relative thereto to withdraw said hook from said one of said apertures.

6. The combination defined in claim 5 wherein said loop portion has at least one portion of reduced thickness and including means on said locking member movable past said loop portion, upon movement of said locking member to and from said position, when said portion of reduced thickness is disposed between said jaws and co-operable with said loop portion to prevent movement of said locking member from said position except when a said portion of reduced thickness is disposed between said jaws.

7. The combination defined in claim 5 wherein said loop portion is movable between a first position in which it is disposed when said tie-down member is connected to said automobile and a second position and including co-operating means on said loop portion and said locking member positively preventing movement of said locking member from said position in which it is adapted to engage said plate portion, when said loop portion is in said first position and permitting such movement of said locking member when said loop portion is in said second position.

8. The combination defined in claim 7 wherein said locking member includes a laterally extending projection and said loop portion, when in said first position, is disposed in the path of movement of said projection during movement of said locking member to and from said position.

9. The combination defined in claim 5 wherein said jaws have aligned openings extending transversely thereof, said locking member comprises a pin slidably mounted in said openings and has an annular collar secured thereto and disposed between said jaws, and the loop portion has a first portion and a second portion of reduced thickness relative to said first portion and said loop portion is movable between a first position in which it is disposed when said tie-down member is connected to said automobile and in which said first portion is disposed between said jaws and adapted to engage said collar to prevent movement of said locking member to and from said position thereof and a second position in which said second portion is disposed between said jaws and out of the path of movement of said collar during movement of said locking member to and from said position thereof.

References Cited in the file of this patent

UNITED STATES PATENTS

| | | |
|---|---|---|
| Re. 19,337 | Butterworth | Oct. 2, 1934 |
| 1,724,555 | Blakely | Aug. 13, 1929 |
| 2,312,985 | Bales | Mar. 2, 1943 |
| 2,322,576 | Huebshman et al. | June 22, 1943 |
| 2,470,706 | Larson | May 17, 1949 |
| 2,498,623 | Poupitch | Feb. 21, 1950 |
| 2,743,684 | Elsner | May 1, 1956 |
| 2,810,539 | Levy et al. | Oct. 22, 1957 |
| 2,859,008 | Zimmer | Nov. 4, 1958 |